United States Patent [19]

Lee

[11] Patent Number: 5,861,730
[45] Date of Patent: Jan. 19, 1999

[54] BATTERY CHARGING APPARATUS

[75] Inventor: Chang-Hum Lee, Anyang, Rep. of Korea

[73] Assignee: SamSung Electronics Co., Ltd., Suwon, Rep. of Korea

[21] Appl. No.: 951,031

[22] Filed: Oct. 15, 1997

[30] Foreign Application Priority Data

Oct. 15, 1996 [KR] Rep. of Korea .................. 1996/46038

[51] Int. Cl.[6] ...................................................... H02J 7/00
[52] U.S. Cl. .......................... 320/106; 320/132; 320/150; 320/152
[58] Field of Search ..................................... 320/106, 125, 320/127, 132, 134, 136, 144, 148, 149, 150, 161, 162, 163, 108, 111, 112, 120, 121, 129, 138, DIG. 12

[56] References Cited

U.S. PATENT DOCUMENTS

| | | |
|---|---|---|
| 4,377,787 | 3/1983 | Kikuoka et al. . |
| 4,707,795 | 11/1987 | Alber et al. . |
| 5,027,294 | 6/1991 | Fakruddin et al. . |
| 5,193,067 | 3/1993 | Sato et al. . |
| 5,200,690 | 4/1993 | Uchida . |
| 5,321,627 | 6/1994 | Reher . |
| 5,345,392 | 9/1994 | Mito et al. . |
| 5,438,248 | 8/1995 | Hyuck . |
| 5,485,073 | 1/1996 | Kasahima et al. . |
| 5,485,090 | 1/1996 | Stephens . |
| 5,489,834 | 2/1996 | Pitkanan . |
| 5,500,584 | 3/1996 | Shimamoto . |
| 5,504,416 | 4/1996 | Holloway et al. . |
| 5,510,690 | 4/1996 | Tanake et al. . |
| 5,541,490 | 7/1996 | Sengupta et al. . |
| 5,541,496 | 7/1996 | Simmonds . |
| 5,612,607 | 3/1997 | Nicolai . |
| 5,631,537 | 5/1997 | Armstrong . |
| 5,637,981 | 6/1997 | Nagai et al. . |
| 5,644,210 | 7/1997 | Hwang . |
| 5,648,715 | 7/1997 | Patino et al. . |
| 5,656,917 | 8/1997 | Theobald . |

*Primary Examiner*—Edward Tso
*Attorney, Agent, or Firm*—Robert E. Bushnell, Esq.

[57] ABSTRACT

A mode-convertible battery charging apparatus is provided. According to the invention, regardless of whether the battery being charged is a completely discharged battery, a fully charged battery or a battery which has a certain amount of electric charge, charging is automatically completed only after the battery is fully charged. Users can detect the charged state of the battery pack, and therefore life shortening of or a damage to the battery due to overcharging of the battery pack can be avoided so as to increase the reliability of the battery. When the detected voltage goes beyond the limit of automatic charging control, the charging operation is not conducted so as to prevent battery damage due to overcurrent.

33 Claims, 6 Drawing Sheets

(Prior Art)

BATTERY CHARGING APPARATUS

CLAIM OF PRIORITY

This application makes reference to, incorporates the same herein, and claims all benefits accruing under 35 U.S.C. § 119 from an application for A BATTERY CHARGING APPARATUS earlier filed in the Korean Industrial Property Office on the 15$^{th}$ of October 1996 and there duly assigned Serial No. 46038/1996.

BACKGROUND OF THE INVENTION

1. Technical Field

The present invention relates to a battery charging apparatus for rechargeable batteries used for portable computers, model machinery, headphone stereos, and portable cordless telephones, and more particularly to a mode-convertible charging apparatus operational under a constant voltage and a constant current charging mode.

2. Related Art

Generally speaking, second batteries mean batteries which can be reused and recharged by a power supply through a reversible reaction after use. Recently, first battery charging apparatuses have been commercialized. However, this starts from the possibility that first batteries can also be charged rather than the characteristics of the charging apparatuses. Therefore, first batteries can not be recharged as many times as second batteries.

Rechargeable batteries are more economical in case batteries have to be replaced frequently. Also, due to a desirable discharging characteristic they are unavoidable for the model machinery and portable machinery which require high current. Recently, various kinds of batteries have been commercialized, ranging from 500 mAh to several Ah capacity, but the charging apparatuses are not yet as diversified as the batteries.

Compared to regular batteries, rechargeable batteries have very low internal resistance, and therefore can provide a large amount of current instantaneously, and also can keep a stable voltage until a discharge terminal voltage is reached because of a good discharge characteristic. Here, a discharge terminal voltage means a limit voltage of a terminating discharge in battery tests. To charge rechargeable batteries, a proper amount of current should be introduced into the batteries. Charging period can be reduced with a high current, but there is a risk of overcharge (charging beyond a full charge limit). In case of overcharge, most batteries produce gas internally which can be absorbed in case the amount of gas is small. A large amount of gas can be produced under high charging current however, and can rupture overcharged rechargeable batteries.

Lead batteries which are popular in cars and in emergency power supplies are cheap, but they are not adequately protected from overcharge or overdischarge. Nickel Cadmium (Ni—Cd) batteries have superior characteristics in charge-discharge and maintenance. However, they are losing popularity because of a low volume energy density (Wh/l) and, especially, due to environmental contamination (heavy metal contamination such as Cadmium). In the design of an automatic battery charging apparatus, the most important task is the determination of the charge completion point (the point where the battery is fully charged). Electrical detection of the increase of terminal voltage of a battery is the only way to accomplish the latter task.

Exemplar recent efforts in the art include U.S. Pat. No. 5,656,917 to Theobald, entitled *Battery Identification Apparatus And Associated Method,* U.S. Pat. No. 5,648,715 to Patino et al., entitled *Method And Apparatus For Current Compensation Of A Battery In A Charger,* U.S. Pat. No. 5,644,210 to Hwang, entitled *Charging Control Method And Circuit Of Recharging Battery,* U.S. Pat. No. 5,637,981 to Nagai et al., entitled *Method For Charging A Secondary Battery And Charger Used Therefor Using Constant Current And Constant Voltage,* U.S. Pat. No. 5,631,537 to Armstrong, entitled *Battery Charge Management/Protection Apparatus,* U.S. Pat. No. 5,612,607 to Nicolai, entitled *Method For The Fast Charging Of A Battery And Integrated Circuit For The Implementation Of This Method,* U.S. Pat. No. 5,541,496 to Simmonds, entitled *Apparatus And Method Of Rapidly Charging Nickel-Cadmium Batteries,* U.S. Pat. No. 5,541,490 to Sengupta et al., entitled *Computer Power Supply System,* U.S. Pat. No. 5,510,690 to Tanaka et al., entitled *Battery Pack, Battery Discrimination Control Apparatus And Method Therefor,* U.S. Pat. No. 5,504,416 to Hooloway et al., entitled *Battery Charger Circuit Including Battery Temperature Control,* U.S. Pat. No. 5,500,584 to Shimomoto, entitled *Battery Charging Method And Apparatus Using Initial Charging Step With Gradually Increasing Charging Current, Quick Charging Step With Large Charging Current And Final Charging Step With Decreasing Charging Current,* U.S. Pat. No. 5,489,834 to Pitkanen, entitled *Battery Type And Temperature Identification Circuit,* U.S. Pat. No. 5,485,090 to Stephens, entitled *Method And Apparatus For Differentiating Battery Types,* U.S. Pat. No. 5,485,073 to Kasashima et al., entitled *Personal Computer For Performing Charge And Switching Control Of Different Types Of Battery Packs,* U.S. Pat. No. 5,438,248 to Hyuck, entitled *Method And Apparatus For Recognizing Different Types Of Batteries,* U.S. Pat. No. 5,345,392 to Mito et al., entitled *Battery Charge Monitor For A Personal Computer,* U.S. Pat. No. 5,321,627 to Reher, entitled *Battery Monitor And Method For Providing Operating Parameters,* U.S. Pat. No. 5,200,690 to Uchida, entitled *Quick Charge Control Apparatus And Control Method Thereof,* U.S. Pat. No. 5,193,067 to Sato et al., entitled *Battery Condition Detection Apparatus,* U.S. Pat. No. 5,027,294 to Fakruddin et al., entitled *Method And Apparatus For Battery-Power Management Using Load-Compensation Monitoring Of Battery Discharge,* U.S. Pat. No. 4,707,795 to Alber et al., entitled *Battery Testing And Monitoring System,* and U.S. Pat. No. 4,377,787 to Kikuoka et al., entitled *System For Measuring State Of Charge Of Storage Battery.*

As evidenced by the foregoing efforts in the art, the change of terminal voltage in charging depends on individual battery state or aging change, and a perfect automatic charging apparatus is highly difficult to achieve. Compromise has to be made among the protection, fast and sufficient charging of battery (in case of high capacity rechargeable batteries using an electrolyte, measurement of a density of the electrolyte is the best way of determining the charging completion point).

There are two ways to charge batteries. One is a constant voltage charging method and the other is a constant current charging method. In the constant voltage charging method, batteries are charged under a constant voltage higher than the nominal voltage in a certain ratio. This method is widely used in an emergency power supply charging mode where a complete charge or discharge are not common. This mode is also called an alternating-current floating charge mode because batteries are charged in a normal period, but they are discharged in case a load is higher than the charging power supply. This method is advantageous in that extra timing apparatuses for battery protection are not necessary, but it is disadvantageous because a large amount of current in the initial charging period can hurt battery or power supply. To overcome this problem, current controlled resistance could be used to control initial current. An increase in voltage however, during the charging period reduces charging current. Therefore, the charging period also increases and sufficient charging is difficult to achieve. This method is popular for economical reasons. In the telephone handset charging apparatus, current is supplied for about twenty hours charging, and charging voltage is kept at higher than the defined value for the alternating-current floating voltage so as to control initial current, incomplete charging and reduction of charging period. This method is common in inexpensive products. The popularity of this method in a telephone handset starts from the high tolerance of nickel cadmium battery against overcharge, in addition to a simple circuit structure composed of a power supply and a resistance.

The constant current charging method charges a battery with a constant current regardless of the increase in battery terminal voltage during the charge process, as explained below. This mode is employed in initial charging and fast charging. In this method, timed charging should be used unless overcharge causes a shortening of battery life. Also, a constant current power supply is necessary in this method because constant current should be supplied to a battery in spite of the increase in battery terminal voltage during a charging process. According to this method, batteries are charged by a constant current, so that the charging period can be reduced and sufficient charging is possible, but overcharge can cause a fatal damage on a battery compared to an overcharge in the constant voltage charging mode. For rapid charging in a constant current charging mode, the power supply should be disconnected at the charging completion point, which is not easy to determine based on the charging period unless a battery is charged after a complete discharge. This means that a 50% discharged battery requires less time than a completely discharged battery in fast charging.

In some of the commercialized fast charging apparatus (e.g., those used in walkman stereo headphones), batteries are not charged immediately, but are discharged for a certain period which examining the drop of terminal voltage and determining the fast charging period (based on a preprogrammed procedure) when they are placed for charging. Again, in this method, the same level of charging is difficult to achieve unless a prediction on an aging change is included; in addition, this method cannot be applied to different model batteries in the same way.

Therefore, there is a need in the prior art for development of a mode-convertible battery charging apparatus which can precisely determine a completely charged state of a rechargeable battery, and which is free from damage resulting from static, surge or noise on removal of the battery. There is also need in the prior art for development of a battery charging apparatus which can detect the type of rechargeable battery pack, and can selectively perform the best charging method (constant current or constant voltage charging) based on the type of battery pack.

SUMMARY OF THE INVENTION

It is, therefore, an object of the invention to provide a mode-convertible battery charging apparatus which can precisely determine a completely charged state of a rechargeable battery (or a battery pack).

It is another object of the invention to provide a battery charging apparatus which is free from damage to a constant voltage charging regulator circuit thereof as a result of static, surge or noise on removal of the battery.

It is another object of the invention to provide a battery charging apparatus which can detect the type of rechargeable battery pack based on cell composing material, and can selectively perform the best charging method based on the type of battery pack.

According to an aspect of the invention, to accomplish the above objects, a battery charging apparatus includes an input terminal to which external DC voltage is applied; an output terminal for supplying charging current for the battery pack; a charging current control means, comprising a current path which connects the input terminal to the output terminal and a control terminal to which control voltage is applied, for controlling the amount of the charging current flowing from the input terminal through the current path according to the control voltage; a charging current detecting means for detecting the charging current flowing through the current path, and outputting current detecting signals whose intensity corresponds to the detected current to the control terminal; a voltage dividing means for dividing the output of the charging current detecting means; a constant voltage control means for detecting the charging voltage of the output terminal, and varying the voltage of the control terminal according to the detected voltage to maintain the charging voltage at a predetermined level; a battery temperature detecting means for detecting the temperature of the battery pack, and generating a battery temperature signal which has an intensity corresponding to the detected temperature; a battery type detecting means for detecting the type of a battery pack by receiving the cell composition information, and generating a battery type signal corresponding to the detected type; a battery voltage detecting means for detecting the terminal voltage of the battery pack, and outputting a battery voltage signal corresponding to the detected voltage; a charging control means for receiving the battery temperature signal, the battery type signal, the battery voltage signal and the output of the voltage dividing means, and outputting a charging enable signal for the charging current control means to conduct a charging operation, a quick charging control signal for controlling the charging speed of the battery pack, a mode control signal for making the charging current control means operate under any one of constant current charging mode and constant voltage charging mode according to the type of the battery pack, and at least one charging current compensating signal for equalizing the amount of the charging current to a predetermined reference current amount; a quick charging control means for controlling charging speed by varying the voltage of the control terminal in response to the quick charging control signal; a charging mode selecting means for selectively outputting the constant voltage control signal to the control terminal to vary the voltage of the control terminal in response to the mode control signal; and a charging current compensating means for compensating the charging current by varying the voltage of the control terminal in response to the at least one of charging current compensating signals.

The charging control means outputs information indicating the charged state of the battery pack according to the output of the voltage dividing means.

This apparatus may further comprise an indicating means for indicating the charged state of the battery pack according to the charged state information output from the charging control means. Since users can detect the charged state of the battery pack using the indicating means, life shortening of or damage to the battery due to overcharge of the battery pack can be avoided, thereby increasing the reliability of the battery.

This apparatus may further comprise an external voltage detecting means for detecting the external DC voltage and outputting a signal corresponding to the detected voltage. The charging control means disables the charging current control means when the voltage detected by the external voltage detecting means is below a predetermined reference voltage. As described above, when the detected voltage goes beyond the limit of automatic charging control, the charging operation is not conducted to prevent battery damage due to overcurrent.

According to another aspect of the invention, a battery charging apparatus includes a charging power supply, comprising a current path and a control terminal for supplying charging current, for supplying the battery pack with the amount of the charging current which corresponds to the variation of control terminal voltage through the current path; a charging current detecting means for detecting the charging current which flows through the current path and varying the voltage of the control terminal according to the detected current; a constant voltage control means for detecting charging voltage which is applied to the battery pack through the current path and outputting a constant voltage control signal for varying the control terminal voltage according to the detected voltage to maintain the charging voltage at a predetermined level; a battery temperature detecting means for detecting the temperature of the battery pack, and generating a battery temperature signal which has an intensity corresponding to the detected temperature; a battery type detecting means for detecting the type of battery pack by receiving cell composition information, and generating a battery type signal corresponding to the detected type; a battery voltage detecting means for detecting the charged voltage of the battery pack, and outputting a battery voltage signal corresponding to the detected temperature; a charging control means for receiving the battery temperature signal, the battery type signal and the battery voltage signal, and outputting a charging enable signal to conduct the charging operation, a quick charging control signal for controlling the charging speed of the battery pack, a mode control signal for making the charging power supply operate under any one of constant current charging mode and constant voltage charging mode according to the type of the battery pack, and at least one charging current compensating signal for equalizing the amount of the charging current to a predetermined reference current amount; a quick charging control means for controlling charging speed by varying the voltage of the control terminal in response to the quick charging control signal; a charging mode selecting means for selectively outputting the constant voltage control signal to the control terminal to vary the voltage of the control terminal in response to the mode control signal; a charging current compensating means for compensating the charging current by varying the voltage of the control terminal in response to the at least one of charging current compensating signals; and a charging current information generating means for providing information about the amount of the charging current flowing through the current path to the charging control means.

In this apparatus, the charging control means outputs charged state information for indicating the charged state of the battery pack according to the charging current amount information.

This apparatus may further comprise an indicating means for indicating the charged state of the battery pack according to the charged state information output from the charging control means.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

While the invention has been described in terms of an exemplary embodiment, it is contemplated that it may be practiced as outlined above with modifications within the spirit and scope of the appended claims.

Figure 1A:
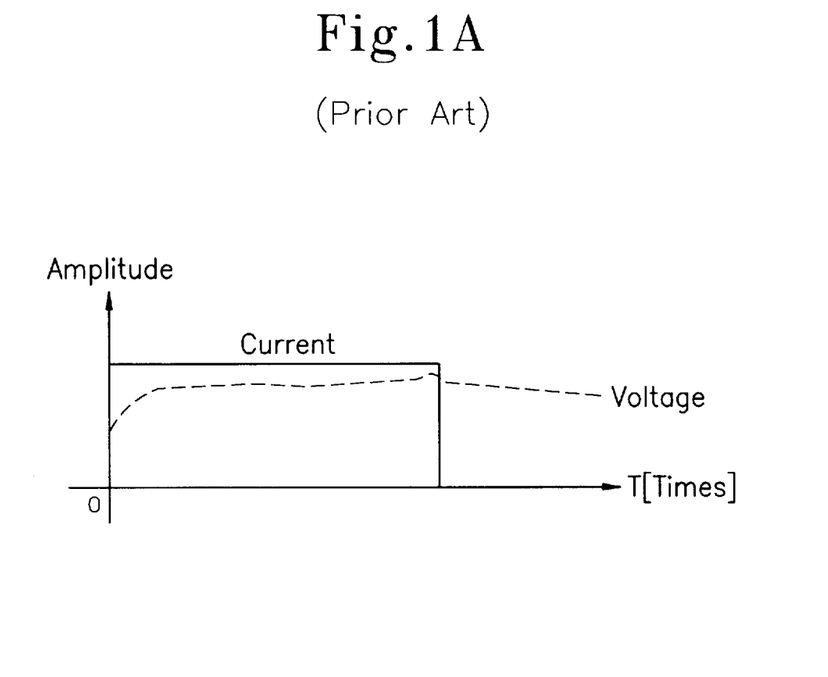
FIG. 1A is a graph showing the charging current and voltage fluctuation of a battery charged only under a constant current charging mode.
Figure 1B:
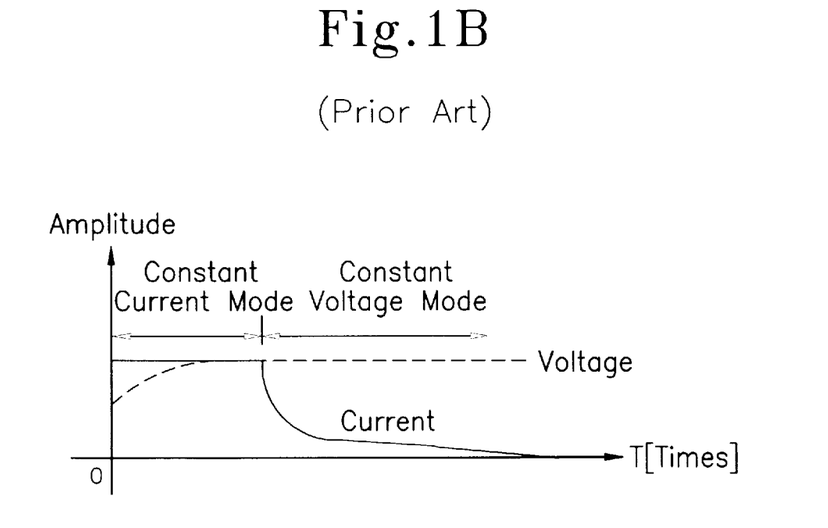
FIG. 1B is a graph showing the charging current and voltage fluctuation of a battery charged under a constant current charging mode and constant voltage charging mode, consecutively.

As shown in FIG. 1A, fast charging is possible under a constant current charging condition, but voltage drops after a certain period. However, FIG. 1B shows that constant voltage charging after charging under constant current for a specified time provides an almost completely charged battery.

Lithium ion batteries with characteristics of high voltage, high energy density, long life and high stability are developed and currently in use. These batteries requires both the constant current and voltage charging. Therefore, a charging apparatus operational under only a constant current or constant voltage method cannot charge the lithium batteries.

A mode-convertible charging apparatus has been developed for reasons described above. This charging apparatus automatically carries out constant current charging when batteries are discharged to a certain point, so that fast charging is possible, as shown in FIG. 1B. If batteries are charged above a certain level, the apparatus conducts a constant voltage charging. Constant voltage charging followed by constant current charging keeps the charging time below 10 hours and maintains a constant voltage condition without switching back to a constant current mode. This constant voltage is enough to charge batteries with the apparatus, and trickle charging is conducted. For example, if a telephone handset is charged by this charging apparatus, for a rapid charging purposes, constant voltage charging is conducted after the handset is used for a short period of time, and constant current charging is conducted after a long use of the handset.

Figure 2:
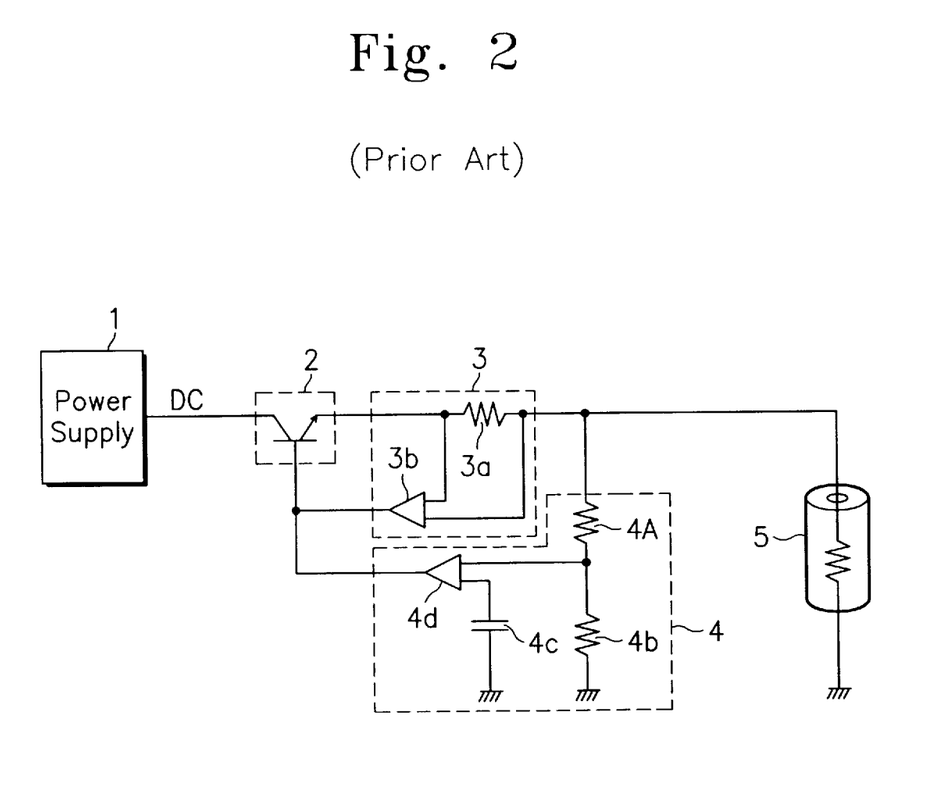
FIG. 2 is a view showing the circuit structure of a conventional battery charging apparatus which is operational under a constant current charging mode and a constant voltage charging mode.

FIG. 2 shows a circuit structure of a conventional mode-convertible battery charging apparatus. To charge a battery 5, this charging apparatus includes a power supply unit 1, a switching regulator 2, a current detection unit 3, and a constant voltage regulation unit 4.

The power supply unit 1 is composed of a transformer for a power supply commensurate with the number of batteries, a main power supply circuit for charging, a 5V regulator for a power supply for the constant voltage standard voltage and logic circuit, an auxiliary power supply for a $V_{EE}$ of operational amplifier and constant current standard voltage, although the above power supply unit 1 is not depicted in detail in the figure. This power supply provides a DC power supply where AC power supply is rectified and smoothed. The apparatus may also comprise a switching regulator 2.

Current detection unit 3 is placed between a switching regulator 2 and a battery 5 where charging current is provided. This current detection unit 3 comprises current detection resistance 3a which converts a current for charging battery 5 to a voltage, and operational amplifier 3b which amplifies a reduced voltage by the current detection resistance 3a and provides the voltage to the feedback terminal of the regulator 2 mentioned above.

Constant voltage control unit 4 comprises dividing resistors 4a and 4b which divide the charging voltage for a battery by a predetermined ratio, standard voltage generator 4c for generating a standard voltage, and operational amplifier 4d which compares the above mentioned divided voltage with the standard voltage and generates a constant voltage charging control signal.

Users can charge battery 5 either in constant current charging or constant voltage charging utilizing this mode-convertible charging apparatus. However, this apparatus cannot distinguish one model of battery from another, and fails to perform constant voltage charging when necessary. Also, this apparatus cannot prevent damage to current detection unit 4 from static, noise or surge when the battery pack is removed, and lowers the reliability.

In the mode-convertible charging apparatus where charging is switched from constant current mode to constant voltage mode, the charging completion point of discharged battery is generally calculated by the execution time of either the constant current charging mode or the constant voltage charging mode. This mode forces charging to be terminated regardless of real charging capacity. In the previous apparatuses, precise determination of charge completion point was not possible because the charging current amount was not detected in a constant voltage charging mode. Especially, for lithium ion batteries, no change of the terminal voltage prevents its level of charging from being determined during the constant voltage charging mode, even though the level of charging can be discovered during the constant current mode as a result of the gradual increase in the terminal voltage. Therefore, users can not tell the level of charging precisely, and incompletely discharged batteries used to be overcharged due to charging beyond full charge. In the case of the constant current charging, only current control in each step, such as fast charging or quick charging, was possible. Detection of charging current beyond the predetermined level in each step was impossible. Failure in detection used to cause damage to a battery pack due to overcharge, or reduced the operation time of the apparatus due to incomplete charging of batteries.

Referring to FIG. 3, battery pack 100 uses two switches SW1 and SW2 for indicating information as to cell composition. When the battery pack 100 is composed of Nickel Cadmium or Nickel Metal Hydride cells, the switch SW1 is switched on and the switch SW2 is switched off. On the contrary, when the battery pack 100 is composed of Lithium ion cells, the switch SW1 is switched off and the switch SW2 is switched on. The battery pack 100 uses the battery cells 101, the anode terminal 102, the cathode terminal 103, the thermistor 104 for detecting the temperature of cells 101, the temperature terminal 105 and the output terminals 106 and 107 for outputting the battery type information. When the battery pack 100 is mounted on the charging apparatus, its respective terminals are connected to their corresponding terminals 102a, 105a, 106a and 107a of the charging apparatus.

The charging apparatus according to the embodiment has microcomputer (or a microprocessor) 300 as a means for controlling the overall charging operation of the battery pack 100. This microcomputer is supplied with power ($V_{DD}$) by the regulator circuit (composed of 290, C10, C11 and R23). The microcomputer 300 is connected to an oscillation circuit formed with crystal oscillator X1, the resistor R20 and the capacitors C6 and C7.

A charging current control unit 210 as a charging source is connected to the input terminal 11, to which DC voltage (Vin) from an AC adaptor is applied, and the output terminal 102a for supplying the battery pack 100 with charging current (Iout). The charging current control unit 210 is a switching regulator with switching unit 211 located on current path 12 for supplying charging current, and the pulse width modulation integrated circuit (PWMIC) 212. The switching unit 211 is composed of the resistors R3 and R4, the diode D1 and the transistors Q1 and Q2. The PWMIC 212 controls the on/off time of the transistor Q2 within the switching unit 211 by outputting a pulse signal which has a duty cycle corresponding to the voltage level of the control terminal 213. Thereby, the charging current (Iout) flowing from the input terminal 11 through the current path 12 is controlled according to the control voltage which is input to the control terminal 213 of the PWMIC 212.

The energy storing unit 220 composed of the inductor L1, the diode D2 and the capacitor C3 is provided to store the electric energy coming from the charging current control unit 210.

The charging current detecting unit 230 is connected to the energy storing unit 220. The charging current detecting unit 230 is composed of the resistors R5~R9' and the operational amplifier 231.

The detecting unit 230 detects the charging current flowing through the current path 12 using the voltage dropped by the resistor R5 for detecting the charging current, and outputs to the control terminal 213 of the PWMIC 212 a current detecting signal having an intensity corresponding to the detected current.

The voltage dividing unit 240 for dividing the output of the charging current detecting unit 230 by a predetermined ratio is composed of the resistors R10 and R11, the diode D4, and the capacitor C4. The output voltage of the charging current detecting unit 230 is divided by the dividing resistors R10 and R11, and the divided voltage is converted to a DC level stable voltage for input to the diode D4 and the capacitor C4, and is provided to the microcomputer 300. The microcomputer 300 can discern the amount of the charging current through the voltage dividing unit 240 when operating in the constant voltage charging mode. For example, if the resistance of the charging current detecting resistor R5 is 0.1 ohm, the amplification factor of the operational amplifier 231 is 25, the ratio between R10 and R11 satisfies R10:R11= 1:4, and 2 A of charging current flows through the current path 12. The voltage difference between both ends of the resistor R5 will be 0.2V, the output voltage of the operational amplifier 231 will be 5.0V, and a voltage of 4.0V will be applied to the terminal (CC) of the microcomputer 300. Under the same condition as above, if 0.5 A of charging current flows through the current path 12, a voltage of 1.0V is applied to the terminal (CC) of the microcomputer 300. FIG. 4 illustrates the output voltage waveform of the voltage dividing unit 240 when charging is consecutively conducted under the constant current charging mode and the constant voltage charging mode. The output of the voltage dividing unit 240 maintains a constant level under the constant current charging mode, but the output of the voltage dividing unit 240 decreases with the lapse of time under the constant voltage charging mode. As described above, the voltage dividing unit 240 fulfills its function as a charging current information generating circuit in that it provides the microcomputer 300 with information about the amount of charging current flowing through the current path.

Figure 5:
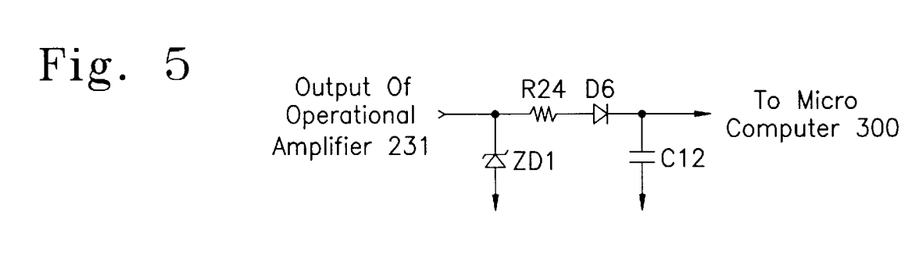
FIG. 5 is a view showing a circuit structure which can replace the voltage dividing circuit shown in FIG. 3.

On the other hand, as illustrated in FIG. 5, a circuit composed of a Zener diode ZD1 whose cathode and anode are connected to the output terminal of the operational amplifier 231 and ground voltage, respectively, the resistor R24, the diode D6 and the capacitor C12 may be used. In this circuit, damage or malfunction of the microcomputer 300 due to surge current or overcurrent is avoided because voltage exceeding the operation voltage of the microcomputer 300 due to surge current or overcurrent is not applied to the microcomputer 300 as a result of the presence of the Zener diode ZD1.

Referring to FIG. 3 again, well-known constant voltage control unit 250 detects the charging voltage (Vout) across output terminal 102a and local reference terminal (e.g., a ground lead) 103a, and outputs a constant voltage control signal for varying the control terminal voltage of the PWMIC 212 according to the detected voltage so as to maintain the charging voltage at a predetermined level.

The battery type detecting unit 260 detects the type of the battery by receiving the cell composition information from the battery pack 100, and provides the microcomputer 300 with the battery type signal corresponding to the detected type. In detail, if the switch SW1 of the battery pack 100 is switched on, the microcomputer 300 perceives that Nickel Cadmium or Nickel Metal hydride battery is connected since the terminal (106a) voltage of the battery type detecting unit 260 is changed to a ground voltage level. In this case, the microcomputer 300 causes the battery pack 100 to be quick and fast charged only under the constant current charging mode. On the contrary, if the switch SW2 of the battery pack 100 is switched from the position shown to an electrical on state, the microcomputer 300 perceives that a Lithium ion battery is connected for charging since the terminal (107a) voltage of the battery type detecting unit 260 is changed to a ground level. In this case, the microcomputer 300 causes the battery pack 100 to be quick and fast charged under the constant current and the constant voltage charging modes.

The battery temperature detecting unit 270, composed of the resistor R21 and the capacitor C8, detects the temperature of the battery pack 100 by means of the thermistor 104 which has a resistance which varies according to the temperature, and provides the microcomputer 300 with a battery temperature signal whose intensity corresponds to the detected temperature.

The battery voltage detecting unit 280, also composed of the resistor R22 and the capacitor C9, detects the terminal (102 or 102a) voltage of the battery pack 100, and provides the microcomputer 300 with a battery voltage signal BV according to the detected voltage.

The microcomputer 300 outputs, based on the input signals, the charging enable signal CE for the charging current control unit 210 to conduct the charging operation, the quick charging control signal FQ for controlling whether the battery pack 100 is quick charged or fast charged, the mode control signal CM for making the charging current control unit 210 operate under any one of the constant current charging mode and constant voltage charging mode according to the type of the battery pack 100, and at least one of charging current compensating signals LC and HC for equalizing the amount of the charging current in accordance with a predetermined reference current amount.

Figure 6:
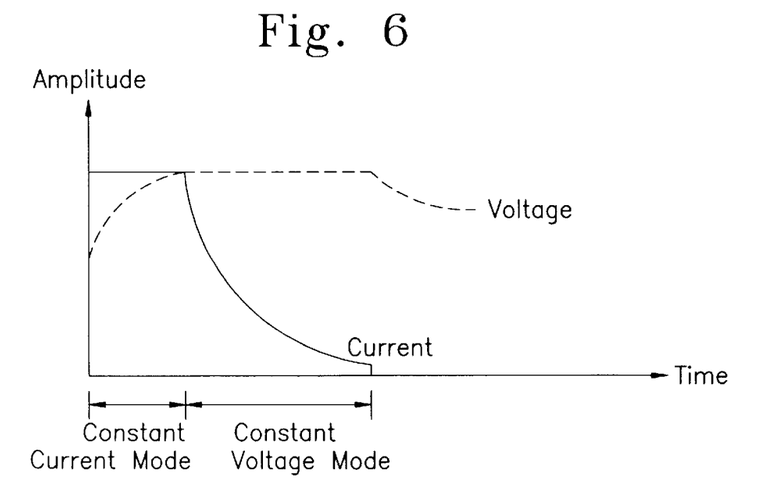
FIG. 6 is a graph showing the current and voltage characteristic under a fast charging mode.
Figures 7, 8:
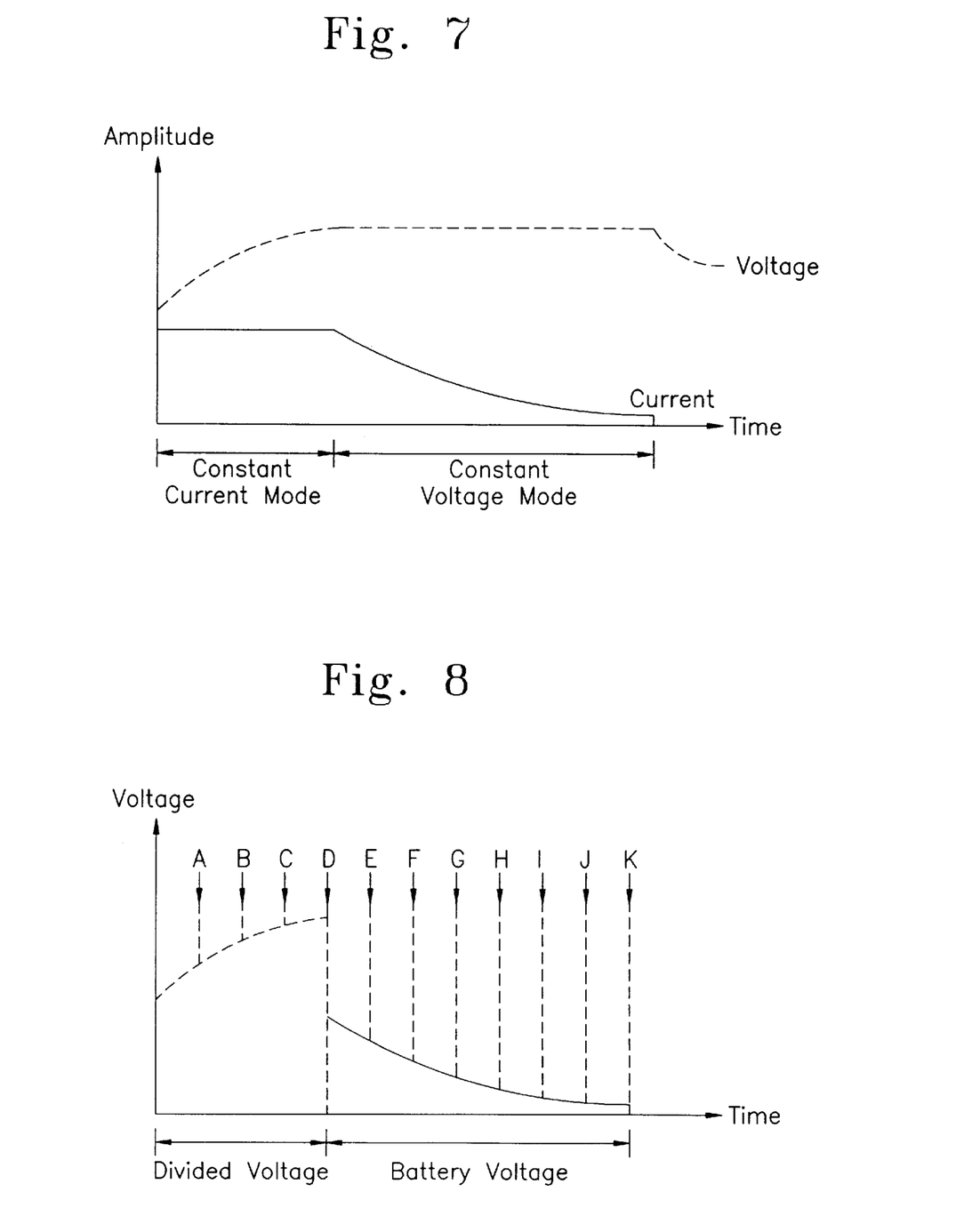
FIG. 7 is a graph showing the current and voltage characteristic under a quick charging mode.
FIG. 8 is a drawing illustrating the indicating mode of a battery charging capacity.

Well-known quick charging control unit 310 controls the charging speed by varying the control terminal (213) voltage of the PWMIC 212 in response to the quick charging control signal FQ from the microcomputer 300. If the level of the quick charging control signal FQ is high, the quick charging control unit 310 increases the charging current amount flowing through the switching unit 211 as illustrated in FIG. 6 by lowering the voltage of the control terminal 213. On the other hand, if the level of the quick charging control signal FQ is low, the quick charging control unit 310 decreases the charging current amount flowing through the switching unit 211 as illustrated in FIG. 7 by heightening the voltage of the control terminal 213. Thereby, the battery is quick charged.

The charging mode selecting unit 320 is composed of the diode D5, the capacitor C5, the resistors R16 and R17, and the transistor Q5. The charging mode selecting unit 320 selectively provides the output signal of the constant voltage control unit 250 to the terminal 213 according to the mode control signal CM from the microcomputer 300. If the level of the mode control signal CM is high, the transistor Q5 is switched on. Thereby, the charging apparatus of the embodiment operates under the constant current charging mode since the output of the constant voltage control unit 250 is not supplied to the terminal 213. On the contrary, if the level of the mode control signal CM is high, the transistor Q5 is switched off. Thereby, the charging apparatus operates under the constant voltage charging mode since the output of the constant voltage control unit 250 is supplied to the terminal 213.

The charging current compensating unit 330 is composed of the resistors R12~R15 and the transistors Q3 and Q4. This charging current compensating unit 330 compensates the charging current flowing through the current path 12 in response to the charging current compensating signals LC and HC.

The microcomputer 300 outputs the charging current compensation signal as follows by analyzing the current detecting signal CC from the voltage dividing unit 240:

If the analysis shows that the battery is in the process of normal charging, the microcomputer 300 outputs the low level charging current compensating signal LC and the high level charging current compensating signal HC, respectively.

If the analysis shows that less amount of charging current than a predetermined amount flows, the microcomputer 300 outputs the high level charging current compensating signal LC and the high level charging current compensating signal HC, respectively.

If the analysis shows that a greater amount of charging current than a predetermined amount flows, the microcomputer 300 outputs the low level charging current compensating signal LC and the low level charging current compensating signal HC, respectively.

As described above, the charging current flowing through the current path 12 is compensated by the variation of the control terminal (213) voltage according to the amount of charging current. The charging current compensating unit 330 may be composed of at least three resistors which are connected in parallel to the control terminal 213 to vary the control terminal voltage, and at least three switching devices which are connected to the resistors and to ground so as to be switched on/off in response to the three types of charging current compensating signals provided from the microcomputer 300. In this case, the current is compensated more accurately.

The microcomputer 300 outputs the information for indicating the charged state of the battery pack 100 according to the output of the voltage dividing unit 240.

Users can know the charged state of the battery pack 100 by this charged state information under the constant voltage charging mode. The charged state of the battery, for example, a Lithium ion battery which should be charged under the constant voltage mode, is discriminated as illustrated in FIG. 8. Under the constant current charging mode in which the charging current provided to the battery pack 100 is constant and the charging voltage of the battery pack 100 rapidly increases, the microcomputer 300 outputs the charged state information discriminated by A to D% according to the voltage variation of the battery pack 100. Under the constant voltage charging mode, in which the charging current of the battery pack 100 is constant and the charging current decreases, the microcomputer 300 outputs the charged state information discriminated by E to K% according to the charging current decreasing rate, that is, the output decreasing rate of the voltage dividing unit 240.

The external voltage detecting unit 340, composed of resistors R1 and R2 and capacitor C1, detects the external DC voltage (Vin) and outputs the signal V$_{ENT}$ corresponding to the detected voltage. If the voltage detected by this detecting unit 340 is indicated by signal V$_{ENT}$ to be below a predetermined reference voltage, microcomputer 300 responds to V$_{ENT}$ by disabling the charging current control unit 210 so as to discontinue the charging operation.

The diode D3 connected to the output terminal 102a is a discharge preventing means for preventing the charged voltage of the battery pack 100 from discharging through the current path. In case the apparatus according to the embodiment is applied to portable computers, the component parts for indicating the charged state of the battery pack 100 according to the charged state information output from the microcomputer 300 is not necessary. Otherwise, it is necessary, but those skilled in the art would apply the charged state indicating parts to this invention without difficulty.

According to the invention as described above, even though any of the completely discharged battery, the fully charged battery and the battery which has a certain amount of electric energy is charged, the charging is automatically completed only after the battery is fully charged. Since users can detect the charged state of the battery pack, a life shortening or a damage of battery due to the overcharge of the battery pack can be avoided to increase the reliability of the battery. When the detected voltage goes beyond the limit of automatic charging control, charging operation is not conducted to prevent battery damage due to overcurrent.

What is claimed is:

1. An apparatus for charging a rechargeable battery pack having cell composition information, said apparatus comprising:

an input terminal to which external DC voltage is applied;

an output terminal for supplying charging voltage and charging current for charging said battery pack;

charging current control means having a current path which connects said input terminal to said output terminal and a control terminal to which control voltage is applied for controlling an amount of said charging current flowing from said input terminal through said current path according to said control voltage;

charging current detecting means for detecting said charging current flowing through said current path, and for outputting to said control terminal a current output having an intensity corresponding to the detected current;

voltage dividing means for dividing the output of said charging current detecting means to produce a voltage divided output;

constant voltage control means for detecting the charging voltage of said output terminal, and for varying the voltage of said control terminal according to the detected voltage to maintain said charging voltage at a predetermined level;

battery temperature detecting means for detecting the temperature of said battery pack, and for generating a battery temperature signal having an intensity corresponding to the detected temperature;

battery type detecting means for detecting the type of said battery pack by receiving said cell composition information, and for generating a battery type signal corresponding to the detected type;

battery voltage detecting means for detecting a terminal voltage of said battery pack, and for outputting a battery voltage signal corresponding to the detected terminal voltage;

charging control means for receiving said battery temperature signal, said battery type signal, said battery voltage signal and said voltage divided output, and for providing a charging enable signal to said charging current control means so as to conduct a charging operation, and for providing a quick charging control signal for controlling the charging speed of said battery pack, a mode control signal for controlling said charging current control means to operate under any one of a constant current charging mode and a constant voltage charging mode according to the type of said battery pack, and at least one charging current compensating signal for equalizing the amount of said charging current to a predetermined reference current amount;

quick charging control means for controlling a charging speed by varying the control voltage provided to said control terminal in response to said quick charging control signal;

charging mode selecting means for selectively outputting said constant voltage control signal to said control terminal to vary the control voltage provided to said control terminal in response to said mode control signal; and charging current compensating means for compensating said charging current by varying the control voltage provided to said control terminal in response to said at least one charging current compensating signal;

wherein said charging control means outputs information indicating a charged state of said battery pack according to the voltage divided output.

2. The apparatus according to claim 1, further comprising external voltage detecting means connected between said input terminal and said charging current control means for detecting said external DC voltage and for outputting a signal corresponding to the detected voltage, wherein said charging control means disables said charging current control means when the voltage detected by said external voltage detecting means is below a predetermined reference voltage.

3. The apparatus according to claim 2, wherein said charging current control means includes:

a switch comprising a first terminal connected to said input terminal, a second terminal connected to said output terminal, and a third terminal to which a pulse signal of predetermined frequency is applied for switchably controlling said charging current in response to said pulse signal; and a switch control unit for providing said pulse signal to control the operation time of said switch, said pulse signal having a duty cycle corresponding to said control voltage.

4. The apparatus according to claim 2, wherein said charging current control means includes a switching regulator comprising a first terminal connected to said input terminal, a second terminal to which said control voltage is applied, and a third terminal connected to said output terminal for outputting said charging current corresponding to said control voltage.

5. The apparatus according to claim 2, further comprising discharge preventing means connected between said charging current control means and said output terminal for preventing a charged voltage of said battery pack from discharging through said current path.

6. The apparatus according to claim 2, further comprising energy storing means connected between said charging current control means and said output terminal for storing electric energy generated by said charging current control means.

7. The apparatus according to claim 1, wherein said charging current detecting means includes:

a resistor provided in said current path for detecting said charging current flowing through said current path, and an amplifier connected to said current path for amplifying the voltage dropped by said resistor in accordance with a predetermined gain and for outputting the amplified voltage to said control terminal.

8. The apparatus according to claim 1, wherein said charging mode selecting means includes a switch for grounding said constant voltage control signal in response to said mode control signal under said constant current charging mode.

9. The apparatus according to claim 1, wherein said charging current compensating means includes:

at least two resistors connected in parallel to said control terminal for varying the voltage of said control terminal, and at least two switching devices, each of which is connected between said at least two resistors and ground so as to be switched on/off in response to said at least one charging current compensating signal provided by said charging control means.

10. The apparatus according to claim 1, further comprising indicating means for indicating a charged state of said battery pack according to said information output from said charging control means.

11. The apparatus according to claim 1, wherein said charging current control means includes:

a switch comprising a first terminal connected to said input terminal, a second terminal connected to said output terminal, and a third terminal to which a pulse signal of predetermined frequency is applied for switchably controlling said charging current in response to said pulse signal; and a switch control unit for providing said pulse signal to control the operation time of said switch, said pulse signal having a duty cycle corresponding to said control voltage.

12. The apparatus according to claim 1, wherein said charging current control means includes a switching regulator comprising a first terminal connected to said input terminal, a second terminal to which said control voltage is applied, and a third terminal connected to said output terminal for outputting said charging current corresponding to said control voltage.

13. The apparatus according to claim 1, further comprising discharge preventing means connected between said charging current control means and said output terminal for preventing a charged voltage of said battery pack from discharging through said current path.

14. The apparatus according to claim 1, further comprising energy storing means connected between said charging current control means and said output terminal for storing electric energy generated by said charging current control means.

15. An apparatus for charging a rechargeable battery pack having cell composition information, said apparatus comprising:

charging power supply means including a current path and a control terminal for supplying said battery pack with an amount of charging current through said current path in correspondence to a variation of control terminal voltage applied to said control terminal;

charging current detecting means for detecting said charging current which flows through said current path and for varying the control terminal voltage according to the detected current;

constant voltage control means for detecting a charging voltage which is applied to said battery pack through said current path and for outputting a constant voltage control signal for varying said control terminal voltage according to the detected voltage to maintain said charging voltage at a predetermined level;

battery temperature detecting means for detecting the temperature of said battery pack, and for generating a battery temperature signal having an intensity corresponding to the detected temperature;

battery type detecting means for detecting a type of said battery pack by receiving said cell composition information, and for generating a battery type signal corresponding to the detected type;

battery voltage detecting means for detecting a charged voltage of said battery pack, and for outputting a battery voltage signal corresponding to the detected charged voltage;

charging control means for receiving said battery temperature signal, said battery type signal and said battery voltage signal, and for outputting a charging enable signal for enabling conduct of said charging operation, a quick charging control signal for controlling a charging speed of said battery pack, a mode control signal for controlling said charging current control means to operate under any one of a constant current charging mode and a constant voltage charging mode according to the type of said battery pack, and at least one charging current compensating signal for equalizing the amount of said charging current to a predetermined reference current amount;

quick charging control means for controlling a charging speed by varying the control terminal voltage in response to said quick charging control signal;

charging mode selecting means for selectively outputting said constant voltage control signal to said control terminal to vary the control terminal voltage in response to said mode control signal;

charging current compensating means for compensating said charging current by varying the control terminal voltage in response to said at least one charging current compensating signal; and charging current information generating means for providing to said charging control means information about an amount of said charging current flowing through said current path, wherein said charging control means outputs charged state information for indicating a charged state of said battery pack according to said information provided by said charging current information generating means.

16. The apparatus according to claim 15, wherein said charging power supply means includes:

a switch comprising a first terminal to which external DC voltage is applied, a second terminal for supplying said battery pack with said charging current, and a third terminal to which a pulse signal of predetermined frequency is applied, said switch being switched on/off in response to said pulse signal; and switch control unit for controlling an operation time of said switch by providing said pulse signal with a duty cycle corresponding to said control voltage.

17. The apparatus according to claim 16, further comprising external voltage detecting means for detecting said external DC voltage and for outputting a signal corresponding to the detected voltage, wherein said charging control means disables said charging current control means when the voltage detected by said external voltage detecting means is below a predetermined reference voltage.

18. The apparatus according to claim 17, further comprising discharge preventing means connected between said charging power supply means and said battery pack for preventing the charged voltage of said battery pack from discharging through said current path.

19. The apparatus according to claim 18, further comprising indicating means for indicating a charged state of said battery pack according to said charged state information output of said charging control means.

20. The apparatus according to claim 15, wherein said charging current detecting means includes:

a resistor provided in said current path for detecting said charging current flowing through said current path, and an amplifier connected to said current path for amplifying the voltage dropped by said resistor in accordance with a predetermined gain and for outputting the amplified voltage to said control terminal.

21. The apparatus according to claim 15, wherein said charging mode selecting means includes a switch for grounding said constant voltage control signal in response to said mode control signal under said constant current charging mode.

22. The apparatus according to claim 15, wherein said charging current compensating means includes:

at least two resistors connected in parallel to said control terminal for varying the voltage of said control terminal, and at least two switching devices, each of which is connected between said at least two resistors and ground so as to be switched on/off in response to said at least one charging current compensating signal provided by said charging control means.

23. The apparatus according to claim 15, wherein said charging current information generating means includes voltage divider for dividing the charging voltage by a predetermined ratio.

24. The apparatus according to claim 15, wherein said charging current information generating means includes a protecting element for protecting said charging control means from surge current and overvoltage.

25. The apparatus according to claim 24, said protecting device comprising a Zener diode having a first end connected to an output terminal of said charging current detecting means and having a second end connected to ground.

26. An apparatus for charging a rechargeable battery pack having cell composition information, said apparatus comprising:

an input terminal to which external DC voltage is applied;

an output terminal for supplying charging voltage and charging current for charging said battery pack;

charging current control means having a current path which connects said input terminal to said output terminal and a control terminal to which control voltage is applied for controlling an amount of said charging current flowing from said input terminal through said current path according to said control voltage;

charging current detecting means for detecting said charging current flowing through said current path, and for outputting to said control terminal a current output having an intensity corresponding to the detected current;

voltage dividing means for dividing the output of said charging current detecting means to produce a voltage divided output;

constant voltage control means for detecting the charging voltage of said output terminal, and for varying the voltage of said control terminal according to the detected voltage to maintain said charging voltage at a predetermined level;

battery detecting means for detecting at least one of the temperature, the type and a terminal voltage of said battery pack, and for generating at least one detection signal;

charging control means for receiving said at least one detection signal and said voltage divided output, and for providing a charging enable signal to said charging current control means so as to conduct a charging operation, a quick charging control signal for controlling the charging speed of said battery pack, and a mode control signal for controlling said charging current control means to operate under any one of a constant current charging mode and a constant voltage charging mode;

quick charging control means for controlling a charging speed by varying the control voltage provided to said control terminal in response to said quick charging control signal; and charging mode selecting means for selectively outputting said constant voltage control signal to said control terminal to vary the control voltage provided to said control terminal in response to said mode control signal.

27. The apparatus according to claim 26, wherein said charging control means provides at least one current compensating signal for equalizing the amount of said charging current to a predetermined reference current amount.

28. The apparatus according to claim 27, further comprising charging current compensating means responsive to said at least one current compensating signal for compensating said charging current by varying the control voltage provided to said control terminal.

29. An apparatus for charging a rechargeable battery pack having cell composition information, said apparatus comprising:

charging power supply means including a current path and a control terminal for supplying said battery pack with an amount of charging current through said current path in correspondence to a variation of control terminal voltage applied to said control terminal;

charging current detecting means for detecting said charging current which flows through said current path and for varying the control terminal voltage according to the detected current;

constant voltage control means for detecting a charging voltage which is applied to said battery pack through said current path and for outputting a constant voltage control signal for varying said control terminal voltage according to the detected voltage to maintain said charging voltage at a predetermined level;

battery detecting means for detecting at least one of the temperature, the type and a charged voltage of said battery pack, and for generating at least one detection signal;

charging control means for receiving said at least one detection signal and for outputting a charging enable signal for enabling conduct of said charging operation, a quick charging control signal for controlling a charging speed of said battery pack, and a mode control signal for controlling said charging current control means to operate under any one of a constant current charging mode and a constant voltage charging mode;

quick charging control means for controlling a charging speed by varying the control terminal voltage in response to said quick charging control signals; and charging mode selecting means for selectively outputting said constant voltage control signal to said control terminal to vary the control terminal voltage in response to said mode control signal.

30. The apparatus according to claim 29, further comprising charging current information generating means for providing, to said charging control means, information about an amount of said charging current flowing through said current path.

31. The apparatus according to claim 29, wherein said charging control means outputs charged state information for indicating a charged state of said battery pack according to said information provided by said charging current information generating means.

32. The apparatus according to claim 29, wherein said charging control means provides at least one current compensating signal for equalizing the amount of said charging current to a predetermined reference current amount.

33. The apparatus according to claim 32, further comprising charging current compensating means responsive to said at least one current compensating signal for compensating said charging current by varying the control voltage provided to said control terminal.

* * * * *

UNITED STATES PATENT AND TRADEMARK OFFICE
CERTIFICATE OF CORRECTION

PATENT NO. : 5,861,730
DATED : January 19, 1999
INVENTOR(S) : Chang-Hum Lee

Figure 3A:
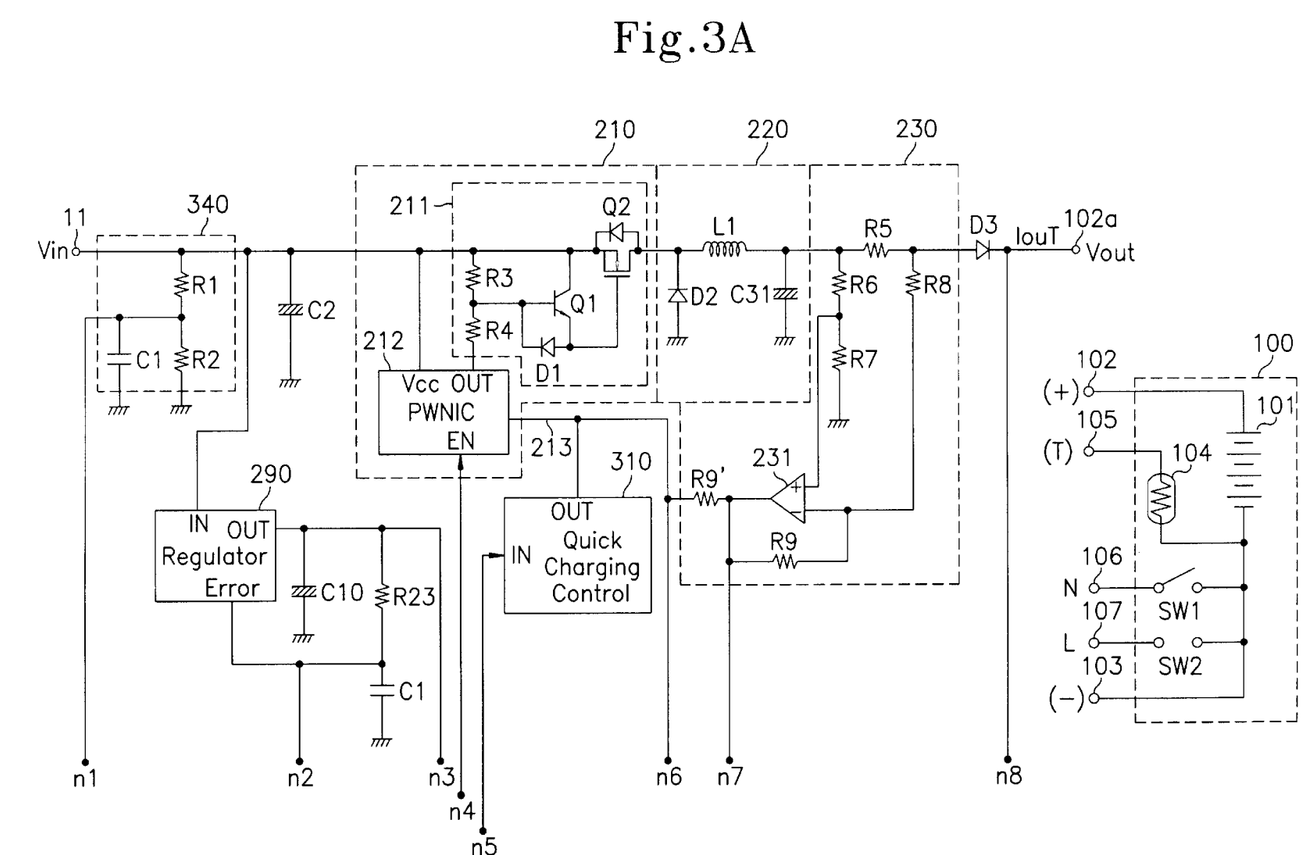
FIG. 3 is a view showing the circuit structure of a battery charging apparatus according to a preferred embodiment of this invention.
Figure 3B:
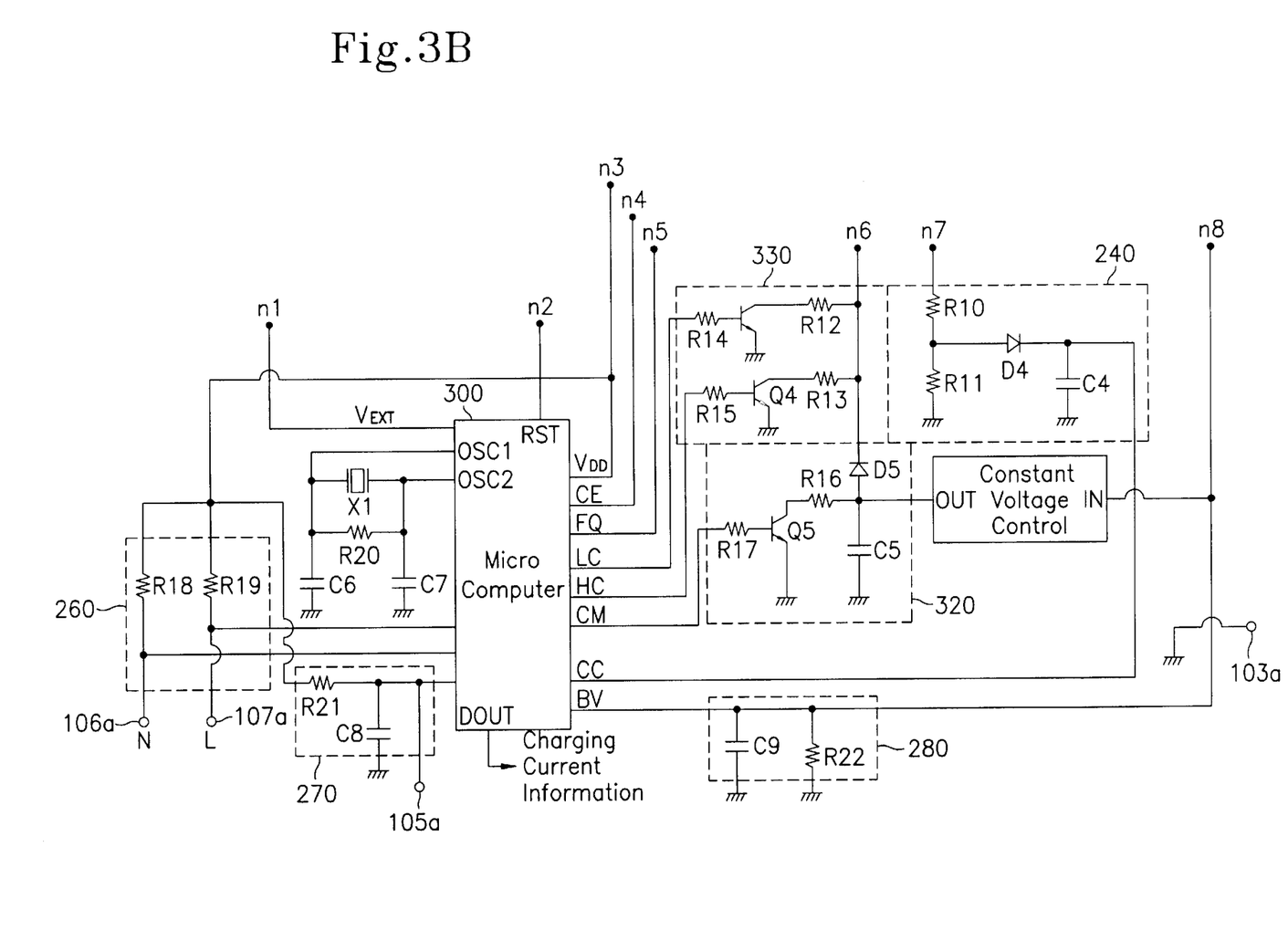
Figure 4:
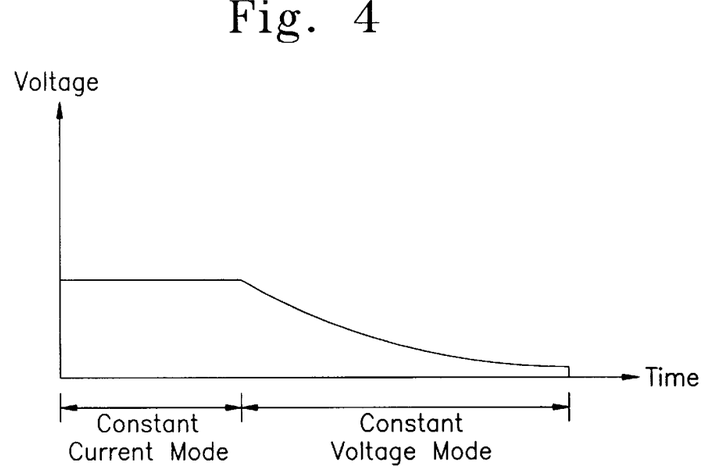
FIG. 4 is a view showing the output waveform of the voltage dividing circuit shown in FIG. 3.

It is certified that error appears in the above-identified patent and that said Letters Patent is hereby corrected as shown below:

Column 6, line 21, change "FIG. 3" to --FIGS. 3A and 3B together form--.

Column 6, line 27, change "FIG. 3" to --FIGS. 3A-3B--.

Column 9, line 35, change "FIG. 3" to --FIGS. 3A-3B--.

Signed and Sealed this

Thirtieth Day of March, 1999

Attest:

Q. TODD DICKINSON

*Attesting Officer*          *Acting Commissioner of Patents and Trademarks*